US010455351B1

(12) United States Patent
Kiemele et al.

(10) Patent No.: US 10,455,351 B1
(45) Date of Patent: Oct. 22, 2019

(54) SHARING GEO-LOCATED INFORMATION (71) Applicant: Microsoft Technology Licensing, LLC, Redmond, WA (US)

(72) Inventors: Kenneth Liam Kiemele, Redmond, WA (US); Donna Katherine Long, Redmond, WA (US); Bryant Daniel Hawthorne, Duvall, WA (US); Anthony Ernst, Woodinville, WA (US); Kendall Clark York, Bellevue, WA (US); Jeffrey Sipko, Kirkland, WA (US); Janet Lynn Schneider, Bellevue, WA (US); Christian Michael Sadak, Seattle, WA (US); Stephen G. Latta, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/972,062

(22) Filed: May 4, 2018

(51) Int. Cl.
*H04W 4/02* (2018.01)

(52) U.S. Cl.
CPC .................... *H04W 4/02* (2013.01)

(58) Field of Classification Search
CPC ........... H04W 4/02; G06T 17/05; H04L 67/12
See application file for complete search history.

(56) References Cited

U.S. PATENT DOCUMENTS

| 7,084,809 | B2 | 8/2006 | Hockley, Jr. et al. |
| 7,904,244 | B2 | 3/2011 | Sugla |
| 8,838,135 | B2 | 9/2014 | Moshfeghi |
| 9,851,449 | B2 | 12/2017 | Polehn et al. |
| 2012/0249416 | A1 | 10/2012 | Maciocci et al. |

(Continued)

FOREIGN PATENT DOCUMENTS

FR 3020676 A1 11/2015

OTHER PUBLICATIONS

Randell, et al., "Low Cost Indoor Positioning System", In Proceedings of International Conference on Ubiquitous Computing, Sep. 30, 2001, 7 Pages.

(Continued)

*Primary Examiner* — Myron Wyche
(74) *Attorney, Agent, or Firm* — Alleman Hall Creasman & Tuttle LLP (57) ABSTRACT

Examples are disclosed that relate to devices and methods for sharing geo-located information between different devices. In one example, a method comprises receiving the geo-located information from a first user device having a first data type compatible with a first output component of the device, receiving first sensor data from the first device, determining a location of the geo-located information within a coordinate system in a physical environment, determining that a second user device is located in the physical environment, determining that the second device does not comprise an output component that is compatible with the first data type, transforming the geo-located information into a second data type compatible with a second output component of the second device, determining that the second device is proximate to the location of the geo-located information, and sending the geo-located information to the second device for output by the second output component.

20 Claims, 7 Drawing Sheets

(56) References Cited

U.S. PATENT DOCUMENTS

| | | | |
|---|---|---|---|
| 2014/0204077 A1* | 7/2014 | Kamuda | A63F 13/335 345/419 |
| 2016/0184726 A1* | 6/2016 | Andersson | A63H 30/04 710/8 |
| 2017/0093882 A1 | 3/2017 | Khuu et al. | |
| 2018/0205793 A1* | 7/2018 | Loeb | H04W 4/70 |
| 2018/0232693 A1* | 8/2018 | Gillen | G06Q 10/0834 |

OTHER PUBLICATIONS

Rodríguez-Navarro, "Indoor Positioning System Based on a PSD Detector, Precise Positioning of Agents in Motion Using AoA Techniques", In Journal of Sensors, vol. 17, Issue 9, Sep. 15, 2017, pp. 1-26.

Schafer, et al., "Pedestrian Indoor Navigation Using a Wireless Pocket-IMU and User-augmented Maps", In Proceedings of the 2nd ACM SIGCOMM Workshop on Networking, Systems, and Applications for Mobile Handhelds, Aug. 30, 2010, pp. 1-3.

"Geolocation-Wikipedia", Retrieved From: https://en.wikipedia.org/wiki/Geolocation, Retrieved Date: Jul. 8, 2019, 3 Pages.

"International Search Report and Written Opinion Issued in PCT Application No. PCT/US2019/029512", dated Jul. 15, 2019, 13 Pages.

\* cited by examiner

SHARING GEO-LOCATED INFORMATION

BACKGROUND

Users of various computing devices, such as smart phones, augmented reality, virtual reality and internet of things (IoT) devices, may desire to share different types of content. Multiple devices may have different sensor and output capabilities. In some examples, different sensor and output capabilities may make sharing content between devices challenging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to methods, computing devices and head-mounted display devices for sharing geo-located information in a physical environment between different devices. In one example, a method comprises receiving the geo-located information from a first user device in the physical environment, where the geo-located information has a first data type that is compatible with a first output component of the first user device. First sensor data is received from a sensor of the first user device and is used to determine a location of the geo-located information within a coordinate system in the physical environment.

The method determines that a second user device is located in the physical environment, and that the second user device does not comprise an output component that is compatible with the first data type of the geo-located information. Based on determining that the second user device does not comprise an output component compatible with the first data type, the geo-located information is transformed from the first data type into a second data type that is compatible with a second output component of the second user device. Using data from a sensor of the second user device, the method determines that the second user device is located proximate to the location of the geo-located information in the physical environment. Based on determining that the second user device is located proximate to the location of the geo-located information, the geo-located information is sent in the second data type to the second user device for output by the second output component.

DETAILED DESCRIPTION

A wide variety of computing devices may be utilized to experience many different forms and types of content. More recently, some technologies enable users to experience a partially virtual or fully virtual world. For example, augmented reality head-mounted display (HMD) devices may include a partially transparent display that blends a user's view of the real world with displayed virtual objects and other content. Virtual reality HMD devices may display a fully-immersive, entirely virtual environment with no view of the real world. Other devices, such as laptops, smartphones, smart watches and IoT devices, may have a wide variety of different output and sensing capabilities ranging from powerful, high-end devices to relatively simple, low-end devices with limited output and sensing functionality.

In some examples, the different sensor and output capabilities of different devices may make sharing virtual content and sensory input between devices challenging. For example, when multiple users and devices are in the same room or other space, different users may create and view geo-located virtual content at various locations. A new user with a device having output components that are not compatible with the virtual content may be unable to experience the previously-generated content.

Figure 1:
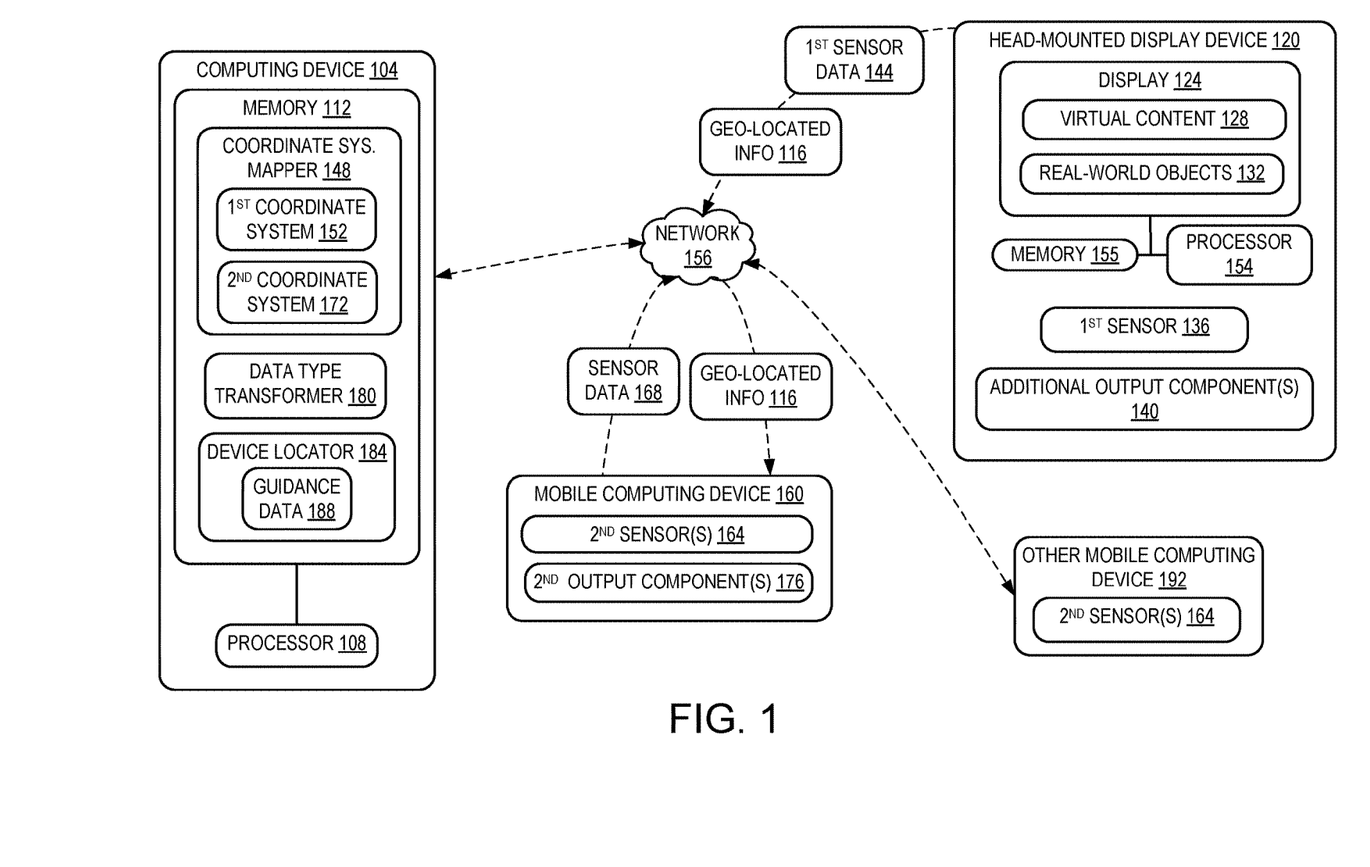
FIG. 1 shows a block diagram illustrating an example system for sharing geo-located information in a physical environment between different devices according to examples of the present disclosure.

Accordingly, examples are disclosed that relate to methods, computing devices and head-mounted display devices for sharing geo-located information in a physical environment between different devices. With reference now to FIG. 1, in one example a computing device 104, such as a network server, may comprise a processor 108 and a memory 112 holding instructions executable by the processor to facilitate the sharing of geo-located information between different devices. In different examples the computing device 104 may comprise a network server, edge computing device, tablet computer, home-entertainment computer, gaming device, mobile computing device, mobile communication device (e.g., smartphone), and/or other computing device.

As described in the use case examples provided below, the computing device 104 may be communicatively coupled via network 156 with various user devices that may be presently co-located, or were co-located at different times, in the same physical environment. While in the environment, a first device may generate geo-located information that is compatible with an output component (display, speaker, etc.) of the device. As described below, the computing device 104 may facilitate sharing of the geo-located information with a second device located in the environment that does not have the same output capabilities as the first device. In some examples, the computing device 104 may host a remote service that shares geo-located information between devices as described herein. In some examples, the devices could modify information for the other device. For example, where a display-only device leaves a geo-located text note, an audio-only device might modify the text note using text-to-speech, and vice versa.

In the example of FIG. 1, the computing device 104 may receive geo-located information 116 from a first user device, such as head-mounted display (HMD) device 120, that is located in a physical environment. In some examples, the HMD device 120 may comprise an at least partially transparent display 124 configured to display virtual content 128 and enable the user to view real-world objects 132 in the surrounding environment. The HMD device 120 also may comprise one or more additional output component(s) 140 other than the display 124, such as a speaker and/or a haptic stimulator. Additional details regarding components and functionality of the HMD device 120 are discussed below with reference to FIG. 4.

In some examples, the HMD device 120 may also comprise one or more sensors, such as first sensor 136. For example, the HMD device 120 may comprise an integrated depth sensor system, optical sensor system, and/or position sensor system. The first sensor 136 may be configured to generate first sensor data 144 comprising depth images, stereo camera images, inertial data, or other suitable data to develop a map of the physical environment.

In some examples the first sensor 136 may comprise one or more of an infrared, color, stereoscopic, and/or depth camera. For example, the HMD device 120 may utilize first sensor data 144 in the form of depth camera data to perform simultaneous location and mapping (SLAM) within the physical environment. Using the depth camera data, the HMD device 120 may develop a virtual map of the physical environment, including a mesh of reconstructed surfaces within the physical environment. In these examples, surface reconstruction information may be used to identify objects and features in the physical environment, and to locate the HMD device 120 and the geo-located information 116 within the physical environment.

In some examples, the HMD device 120 may generate the geo-located information 116 and anchor the information at a location within the virtual map of the physical environment via one or more virtual anchors. For example, a script describing the geo-location of the virtual anchor(s) within the virtual map may be generated and attached to the virtual object or other geo-located information 116 to be anchored. Such anchors may be fixed relative to real world objects in the physical environment (e.g., world-locked). In this manner, geo-located information 116 may be displayed in a location that is computed relative to the anchor.

Figure 2:
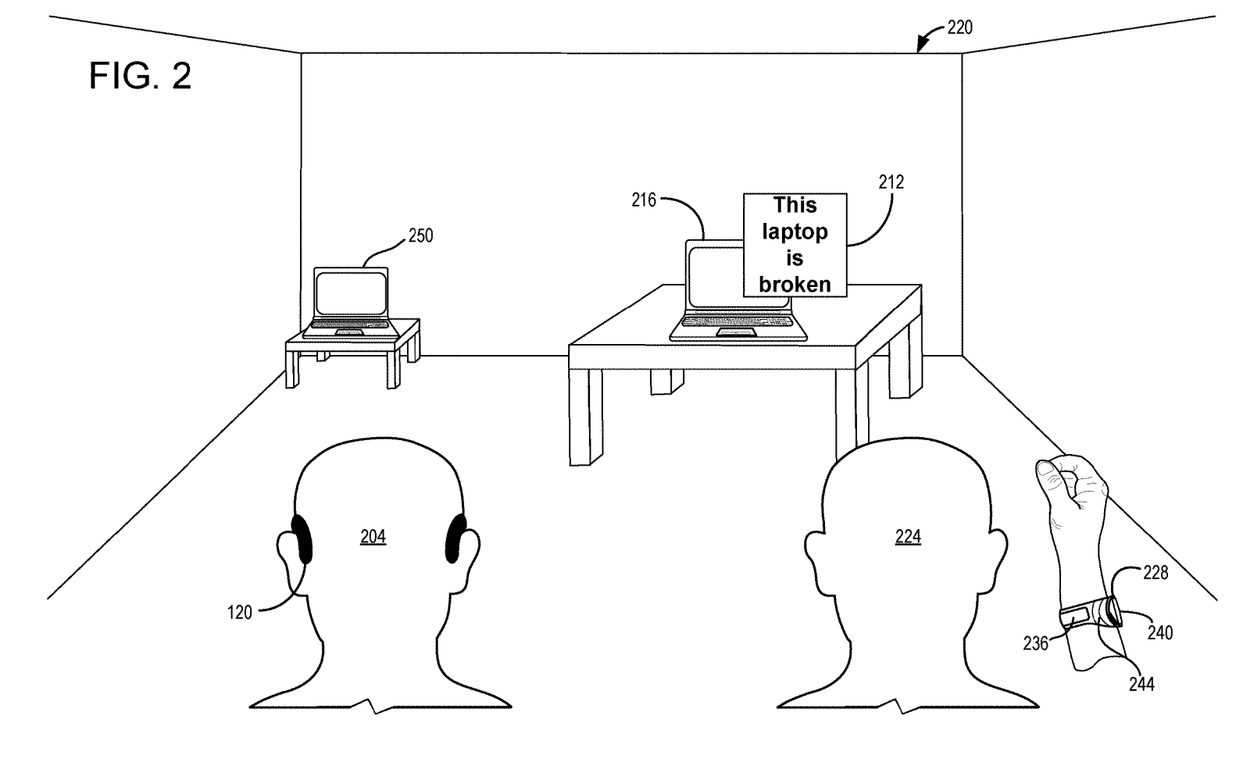
FIG. 2 is an illustrative example of a use case scenario in which a head-mounted display device shares geo-located information with a wearable computing device according to examples of the present disclosure.

In one example illustrated in FIG. 2, a user 204 wearing HMD device 120 may create geo-located information in the form of a holographic note 212 having a holographic image data type that may be viewed via the display 124 of the HMD device. In this example the holographic note 212 indicates that a laptop 216 in a room 220 is broken. The user 204 may anchor the holographic note 212 to a geo-location of the laptop 216 so that a second user 224, such as a technical support employee, may notice the holographic note 212 and repair the laptop 216 after the user 204 has left the room.

It will be appreciated that the holographic image data type of the holographic note 212 is merely one example data type of geo-located information 116 that may be utilized with the concepts of the present disclosure. In other examples, the geo-located information 116 may comprise any other suitable data types, such as audio data, video data, haptic data, and non-holographic image data, that may be output via an output component of the device generating the information, such as HMD device 120.

To enable sharing of the geo-located holographic note 212 with other devices having different output capabilities, the computing device 104 may receive the holographic note 212 generated by HMD device 120. The computing device 104 also may receive first sensor data 144 from HMD device 120 in the form of depth camera images of the room 220. In some examples, a coordinate system mapper 148 may utilize the depth camera images to develop a virtual map of the room 220 that includes a first coordinate system 152. In this manner, and using at least the depth camera image data, the computing device 104 may determine a location of the geo-located holographic note 212 within the first coordinate system 152 in the room 220. In some examples, the HMD device 120 may generate and provide at least a portion of the virtual map of the room 220 to computing device 104 as geo-located information 116.

It will be appreciated that, in other examples, the coordinate system mapper 148 and other aspects of the computing device 104 described herein may be integrated into the HMD device 120. For example, the HMD device 120 may comprise a processor 154 and a memory 155 holding instructions executable by the processor 54 to carry out the methods for sharing geo-located information between different devices as described herein.

With reference again to the example illustrated in FIG. 1, the HMD device 120 may be communicatively coupled to the computing device 104 via the network 156. The network 156 may also couple the computing device 104 to one or more other computing devices, such as mobile computing device 160 and other mobile computing device 192. In different examples, the mobile computing device 160 and other mobile computing device 192 may comprise a laptop, smartphone, IoT device, or other type of mobile computing device. In some examples, the mobile computing device 160 and/or other mobile computing device 192 may comprise a smart watch or other wearable computing device. For example and as described in more detail below, in FIG. 2 the second user 224 is illustrated wearing a smart watch 228 that may be communicatively coupled to computing device 104 via network 156.

With reference again to FIG. 1, the mobile computing device 160 may comprise one or more second sensors 164 that may be different from the first sensor 136 of the HMD device 120. In some examples, the second sensor(s) 164 may generate sensor data 168 that may be utilized by the mobile computing device 160 and/or another computing device, such as computing device 104, to localize the mobile computing device. For example, the mobile computing device 160 may have second sensors 164 in the form of a GPS receiver and an inertial measurement unit (IMU). In other examples, the second sensor(s) 164 may comprise any other sensor suitable to localize the device in a coordinate system, including an image recognition sensor, LIDAR system, acoustic ranging sensor, sounds sensor, temperature sensor, pressure sensor, etc.

Using the sensor data 168 from second sensor(s) 164, in some examples the mobile computing device 160 may determine its location in a second coordinate system 172. In some examples, the coordinate system mapper 148 of computing device 104 may receive and utilize the sensor data 168 to determine the location of the mobile computing device 160 in a second coordinate system 172. For example, the second coordinate system 172 may comprise global geo-coordinates computed using the GPS signals from a GPS receiver. In other examples, the second coordinate system 172 may comprise a self-referenced inertial coordinate system that utilizes inertial signals from an IMU of the mobile computing device 160.

In these examples, the second coordinate system 172 may be established independently of the first coordinate system 152 of the HMD device 120. Additionally, the second coordinate system 172 may utilize a different frame of reference from the first coordinate system 152. As such, it may be difficult for the HMD device 120 or other devices using a different coordinate system to share geo-located information 116 with the mobile computing device 160. Accordingly, and as described in more detail below, in some examples the coordinate system mapper 148 of the computing device 104 may map the location of the mobile computing device 160 from the second coordinate system 172 to the first coordinate system 152.

For example, the mobile computing device 160 may obtain a location via GPS in the second coordinate system 172. The location in the second coordinate system 172 may then be mapped to a location in the first coordinate system 152 by the computing device 104. For example, the map of the physical environment generated using the first sensor data 144, surface reconstruction information, and other features of the physical environment may be used to map the location of the mobile computing device 160 in the second coordinate system 172 to a location in the first coordinate system 152.

In some examples, objects or other aspects of the physical environment may be localized in both coordinate systems. For example, a QR code with a known GPS coordinate may be used as a reference point for both the first coordinate system 152 and the second coordinate system 172, and allow mapping of coordinates from one system to another. For example, if an object is 1 meter east of a known object in GPS coordinates, it will also be 1 meter east of the known object in the second (mapped) coordinate system.

In another example, devices localized in each coordinate system may detect proximity with each other, such as via near-field communication (NFC), and use the detected proximity to merge the coordinate systems. For example, two devices may be quickly "bumped" together to communicate via NFC and merge coordinate systems, after which the devices may be moved apart. In yet another example, if devices localized in each coordinate system are connected to Wi-Fi, they may each collect a Wi-Fi fingerprint of the physical environment and use the Wi-Fi fingerprints to convert and map coordinates.

As noted above, in some examples the mobile computing device 160 may lack an output component that is compatible with the data type of the geo-located information 116 generated by the HMD 120. For example, the mobile computing device 160 may comprise one or more second output components 176 that are incapable of displaying holographic image data. In the example of FIG. 2, the smart watch 228 may comprise a haptic device 236, an OLED display 240 configured to output non-holographic image data, and a speaker 244 to output audio data. Where the geo-located information 116 is the holographic note 212 of a holographic image data type, none of these output components may be compatible with this data type. Accordingly, the tech support user 224 may be unable to view the holographic note 212 via the smart watch 228.

Accordingly, when the tech support user 224 enters the room 220, the computing device 104 may determine that the smart watch 228 is located in the room 220. Additionally, the computing device 104 may determine that the smart watch 228 does not comprise an output component that is compatible with the holographic image data type of the holographic note 212. For example, the computing device 104 may have stored a device profile of the smart watch 228 in memory 112 that includes the watch's output components and their data type compatibilities. In some examples the computing device may query the smart watch 288 to determine the watch's output devices and their data type compatibilities.

Based on determining that the smart watch 228 does not comprise an output component that is compatible with the holographic image data type, a data type transformer 180 may transform the holographic image data into a second data type that is compatible with one of the output components of the smart watch 228. For example, the data type transformer 180 may transform the holographic text "This laptop is broken" in the note 212 to an audio file that may be broadcast by the speaker 244 of the smart watch 228.

The computing device 104 may then transmit the geo-located note 212 in the form of the audio file to the smart watch 228 for output via the speaker 244. In this manner, even though the smart watch 228 lacks a holographic display, the HMD device 120 may share the holographic note 212 with the smart watch in a manner that enables the smart watch wearer to experience the content of the note.

In some examples, the computing device 104 may transmit the audio file to the smart watch 228 upon determining that the watch is located proximate to the geo-located holographic note 212. For example, where another laptop 250 is in the room 220, broadcasting "This laptop is broken" via the smart watch speaker 244 when the tech support user 224 enters the room may not be helpful, as it may not be clear which laptop is being referenced.

Accordingly and to output the audio file at a useful time, the computing device 104 may use sensor data received from the smart watch 228, such as GPS or IMU data, to determine when the watch is located proximate to the location of the holographic note 212. When the smart watch 228 is determined to be proximate to the note 212, the audio file of the geo-located information may be sent to the watch for broadcast. A proximate location may vary from one application to another and may be defined as a location within a threshold distance of the geo-located information 116, a location within a geo-fence, a location within a room, or a location defined using any other suitable method.

For example, in FIG. 2 a location proximate to the holographic note 212 may be defined as a location within 0.5 meters of the note. Accordingly, when the smart watch 228 comes within 0.5 meters of the location of the holographic note 212, the audio corresponding to the holographic note 212 may be sent to the watch for broadcast by the speaker 244. In other examples, any suitable threshold distance may be utilized. Accordingly, the audio file may be presented to the tech support user in a helpful fashion that enables the user to experience the content of the holographic note 212 in a manner intended by the user of the HMD device 120.

In other examples, the tech support user may modify content of the holographic note 212, such as using a speech-to-text function of the smart watch 228. For example, the tech support user may say "the laptop is fixed" and the holographic note 212 may be updated with respective text.

Figure 3:
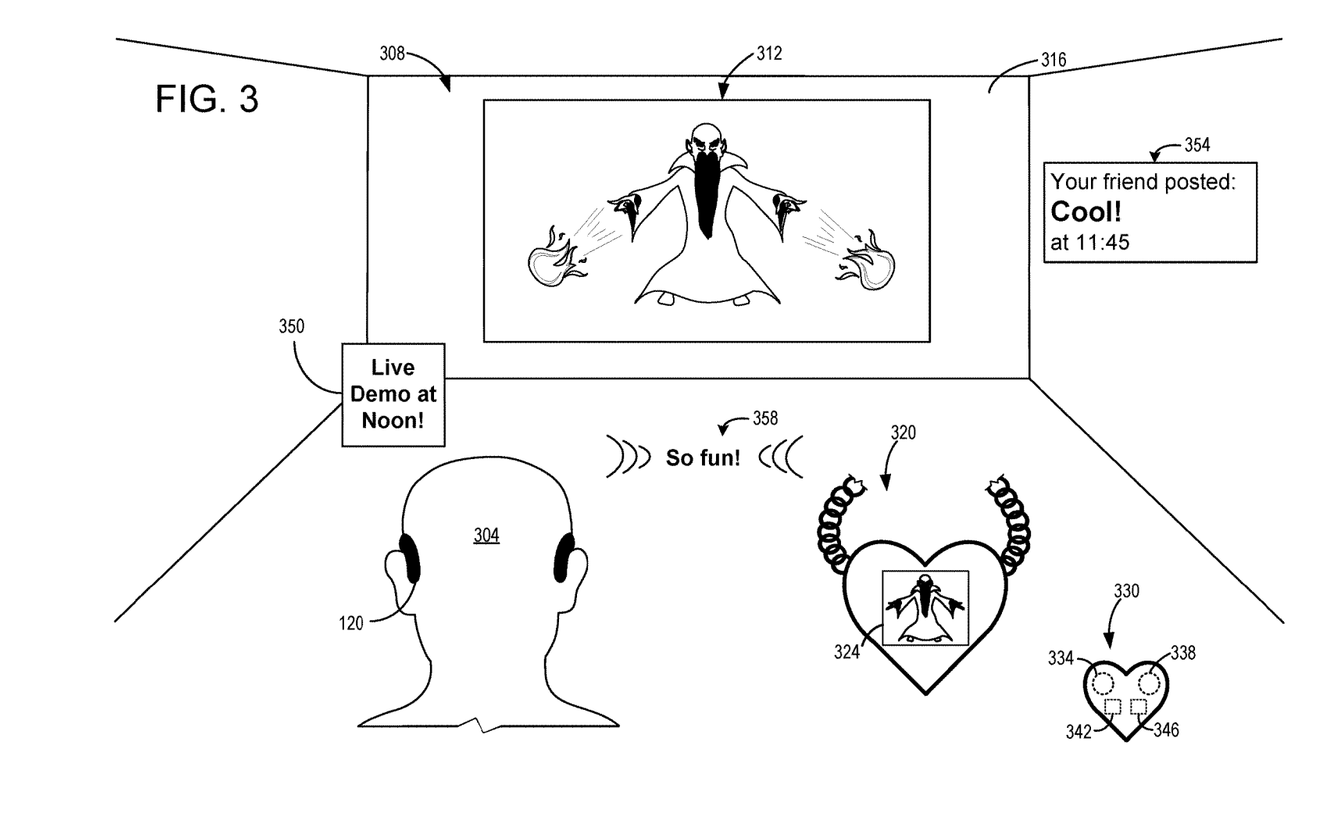
FIG. 3 is another illustrative example of use case scenarios in which geo-located information is shared between devices according to examples of the present disclosure.

In another example illustrated in FIG. 3, a user 304 may be a company representative in the company's booth 308 at a trade show. The user 304 may use an HMD device 120 to display and view a holographic movie 312 of the company's latest game at a geo-location adjacent to a wall 316. Attendees with HMD devices similar to HMD device 120 also may be able to watch the holographic movie 312 via their holographic display. Other attendees may not have HMD devices with holographic displays, but may have simpler, low-end devices that may comprise a speaker and a non-holographic, two-dimensional display.

For example, FIG. 3 illustrates a wearable computing device in the form of a pendant necklace 320 comprising a non-holographic display 324. The wearable computing device 320 may be communicatively coupled via network 156 to the computing device 104. The non-holographic display 324 may not be compatible with the holographic video data type of the holographic movie 312. Accordingly, the computing device 104 may provide the wearable computing device 320 with content of the holographic movie in a second data type that allows a user of the wearable computing device to share the experience of the holographic movie 312. For example, the display 324 may output a smaller, two-dimensional version of the holographic movie 312 when the wearer is in the booth 308. In another example, the wearable computing device 320 may comprise a speaker integrated inside the device and configured to play audio that has been extracted from the holographic movie 312 and provided by computing device 104.

With reference again to FIG. 1, in some examples the computing device 104 may help a user of the mobile computing device 160 find geo-located information 116 shared by another device. In these examples and as described in more detail below, computing device 104 may comprise a device locator 184 that may generate guidance data 188 to assist the user of the mobile computing device 160 in finding the geo-located information 116. Additionally, and to tailor the guidance data 188 to the particular output capabilities of the mobile computing device 160, the guidance data may be generated and sent for output by the second output component 176 of the device.

With reference again to the example of FIG. 3, an attendee of the trade show may have a low-end computing device in the form of a heart-shaped object 330 that may be carried in the hand or in a pocket. The object 330 includes a left haptic stimulator 334 and a right haptic stimulator 338 that may be selectively actuated to give a user haptic directional signals. The object 330 also includes a speaker 342 for broadcasting audio, an IMU 346 and a WiFi module (not shown).

In some examples, the company representative user 304 in booth 308 may utilize computing device 104 to generate guidance data 188 that guides the attendee holding the object 330 to the location of the booth. For example, the device locator 184 of computing device 104 may utilize a Wi-Fi positioning system along with WiFi data and IMU sensor data 168 from the object 330 to locate the object on the trade show floor. With the device located, in one example the device locator 184 may send guidance data 188 in the form of spoken audio directions to the object 330 for output by the speaker 342. When the attendee arrives at the booth 308, the computing device 104 may then send audio of the geo-located holographic movie 312 to the object 330 for output by the speaker 342.

In another example, the device locator 184 may send guidance data 188 in the form of haptic directional signals to the object 330 for output by the left haptic stimulator 334 and right haptic stimulator 338. As the attendee walks on the trade show floor, the device locator 184 guides the attendee to make left and right turns by selectively activating one of the haptic stimulators to vibrate. When the attendee arrives at the booth 308, the computing device 104 may then send audio of the geo-located holographic movie 312 to the object 330 for output by the speaker 342.

Localizing the wearable computing devices 320 and 330 may also enable users to interact with one another and share geo-located content and experiences. For example, the company representative 304 in booth 308 may leave a geo-located holographic note 350 for attendees to see. An attendee visiting the booth 308 may leave a geo-located two-dimensional image 354 of a social media post for other attendees to see. In other examples, users may leave an audio note 358 that plays speech recorded via a microphone of a mobile computing device. For example, a visitor to booth 308 may record a comment via an HMD device equipped with a microphone that may play for other visitors when they enter the booth.

Additionally and as described above, in each of these examples the geo-located information may be transformed from a first data type into a second data type that is compatible with an output component of the other user's device. In this manner, and in one potential advantage of the present disclosure, users with devices having different sensory and output capabilities may interact with one another and share content and experiences.

In some examples, a plurality of devices may interact to distribute the cost of an experience. For example and with reference again to FIG. 1, the mobile computing device 160 and other mobile computing devices 192 may form a distributed network of sensors 164 that may be used to develop an enhanced understanding of a physical environment.

In one example, a sensor 164 of the mobile computing device 160 may comprise a thermometer, and the geo-located information may be associated with a temperature range. For example, the geo-located information may be located in an environment where the temperature typically remains within a predetermined range. In these examples, the sensor 164 may indicate that the mobile computing device 160 is proximate to the location of the geo-located information based on determining that temperature data provided by the sensor falls within the temperature range.

For example, a user of the mobile computing device 160 may enter her favorite grocery store. The walk-in beer room of the store may have a temperature range of between 12 to 15 degrees C., which is well below the average temperature of the store. A few minutes after entering the store, the thermometer of mobile computing device 160 may indicate a temperature of 14 degrees C. Accordingly, the computing device 104 may determine that the user is in the walk-in beer room of the store, and the user may be presented with geo-located information 116 in the room, such as an advertisement for her favorite beer.

In some examples, the computing device 104 may maintain a database of temperatures of the walk-in beer room. Based on determining that the user is in the walk-in beer room and thus proximate to the location of the geo-located information, the temperature data from the sensor 164 may be used to update the database of temperatures. In this manner, the computing device 104 may fuse temperature data from mobile computing device 160 and one or more other mobile computing devices 192 to develop an enhanced understanding of temperature activity in the walk-in beer room.

In some examples, additional temperature data and/or other types of sensor data may be collected as described above from other areas of the store. In this manner, the computing device 104 may benefit from a distributed network of sensors 164 provided by users' mobile computing devices throughout the grocery store, without installing additional fixed sensors at the store's expense.

Figure 4:
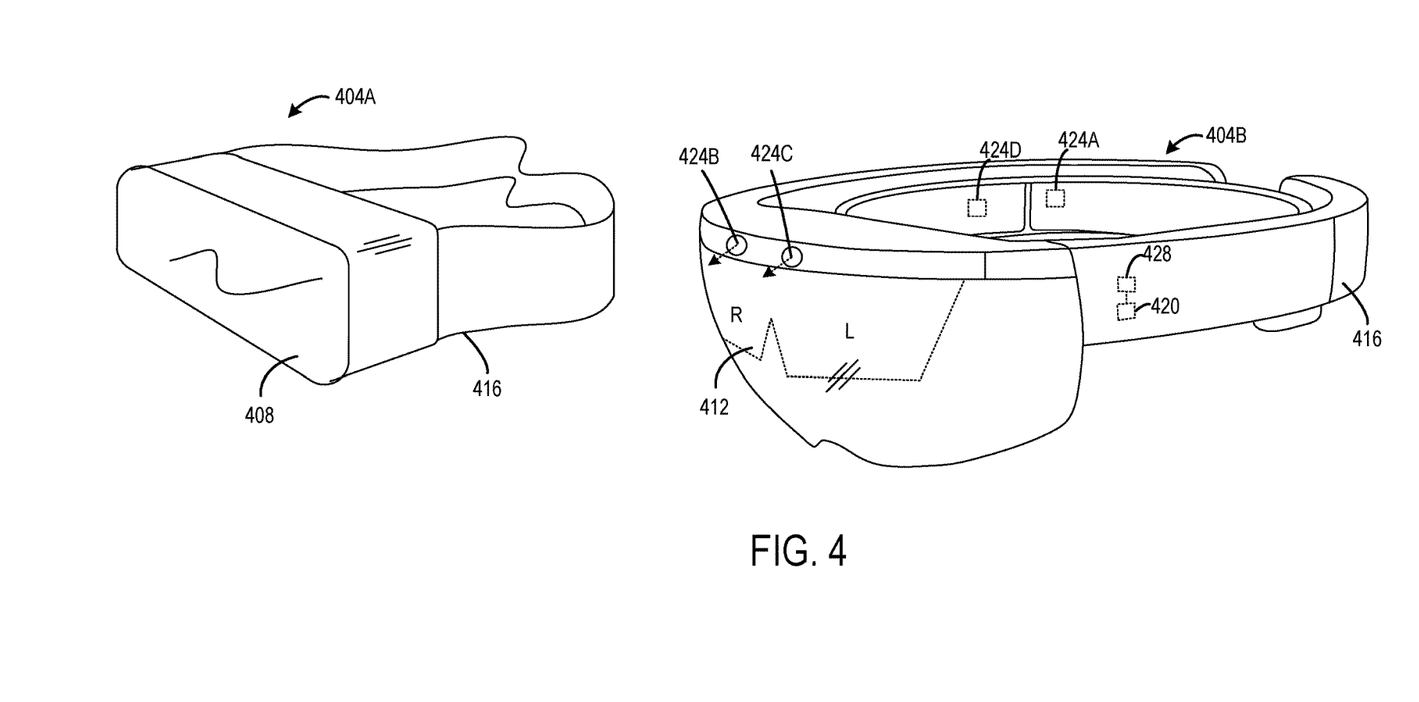
FIG. 4 shows two examples of head-mounted display devices according to examples of the present disclosure.

With reference now to FIG. 4, and as described above, in some examples aspects of the present disclosure may be practiced by an HMD device 120 that may take a variety of forms. In one example, HMD device 120 may take the form of a virtual reality HMD device 404A that includes an opaque, non-see-through display 408. Another example of an HMD device 120 is an augmented reality HMD device 404B that comprises an at least partially transparent display 412. It will be appreciated that the following descriptions of sensors and systems may apply to both the augmented reality HMD device 404B and the virtual reality HMD device 404A.

In the example of FIG. 4, each of the example HMD devices 404A and 404B has a construction that includes a frame 416 that wraps around the head of the user to position a display close to the user's eyes. The frame of virtual reality HMD device 404A may include a rigid portion and an elastic portion whereas the frame 416 of augmented reality HMD device 404B may be substantially rigid around its circumference. The frame 416 may support additional components such as, for example, a processor 420 and input devices 424A, 424B, 424C and 424D. The processor 420 may include logic and associated computer memory 428 configured to share geo-located information in a physical environment between different devices, to receive sensor data from input devices 424A, 424B, 424C and 424D, and to enact various processes described herein. In some examples, the processor 420 and the memory 428 may be analogous to the processor 154 and the memory 155 of the HMD device 120.

Various suitable display technologies and configurations may be used to display images via the displays of the HMD devices 404A and 404B. For example, in virtual reality HMD device 404A, the display 408 may be an opaque display, such as a non-see-through Light-Emitting Diode (LED) display, a Liquid Crystal Display (LCD), or any other suitable type of opaque or otherwise non-see-through display. In augmented reality HMD device 404B, the display 412 may be an at least partially transparent display that is configured to enable a wearer of the augmented reality HMD device 404B to view physical, real-world objects in the physical environment through one or more partially transparent pixels displaying virtual object representations. For example, the display 412 may include image-producing elements such as, for example, a see-through Organic Light-Emitting Diode (OLED) display.

As another example of a transparent display, the augmented reality HMD device 404B may include a light modulator on an edge of the display 412. In this example, the display 412 may serve as a light guide for delivering light from the light modulator to the eyes of a wearer. In other examples, the display 412 may utilize a liquid crystal on silicon (LCOS) display. The display 412 may include both a left L and right R display in a stereoscopic display configuration. The left L and right R displays each display a view of an augmented reality scene from the perspective of the user's corresponding eye. By viewing the augmented reality scene through the left L and right R displays, the user will perceive virtual objects as being located at particular depths in the real world.

The input devices 424A, 424B, 424C and 424D may include various sensors and related systems to provide information to the processor 420. Such sensors may include an inertial measurement unit (IMU) 424A, one or more image sensors 424B, and one or more ambient light sensors 424C. The one or more outward facing image sensors 424B may be configured to capture and/or measure physical environment attributes of the physical environment in which the augmented reality HMD device 404B is located. In one example, the one or more image sensors 424B may include a visible-light camera configured to collect a visible-light image of a physical space. Additionally, the input devices may include a presence sensor 424D that detects whether a user is wearing the HMD device. In one example, the presence sensor 424D may comprise an inwardly-facing image sensor configured to determine whether the user's head is adjacent to the sensor, which indicates the user is wearing the HMD device.

In one example of the augmented reality HMD device 404B that includes the display 412 having a transparent display type, the position and/or orientation of the augmented reality HMD device 404B relative to the physical environment may be assessed so that augmented-reality images may be accurately displayed in desired real-world locations with desired orientations. In both augmented reality HMD device 404B and virtual reality HMD device 404A, the IMU 424A may be configured to provide position and/or orientation data to the processor 420. The orientation derived from the sensor signals of the IMU may be used to display one or more holographic images with a realistic and stable position and orientation. The processor 420 may include a logic processor and the two example HMD devices 404A and 404B may include volatile memory and non-volatile storage, as discussed in more detail below with respect to the example computing system 600 of FIG. 6.

Figure 5A:
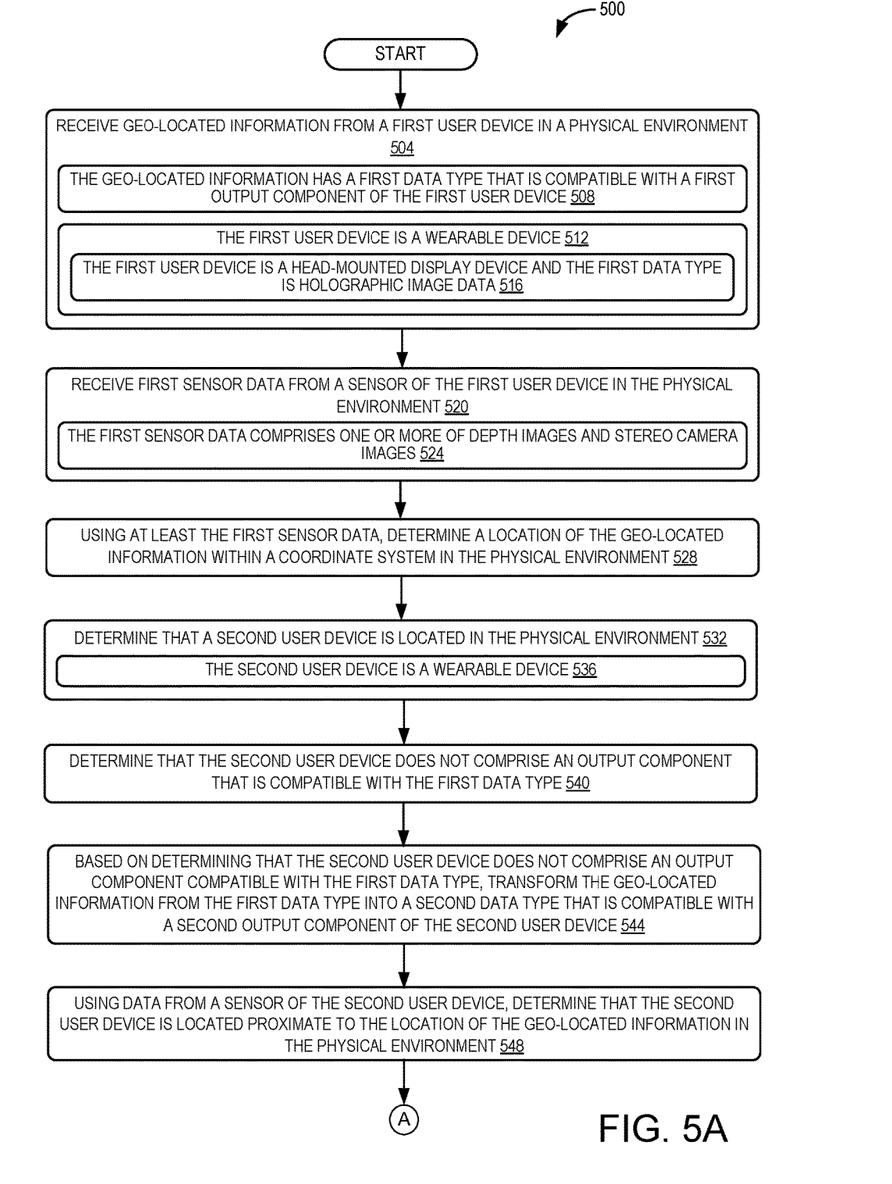
FIGS. 5A and 5B are a flow chart of an example method for sharing geo-located information in a physical environment between different devices.
Figure 5B:
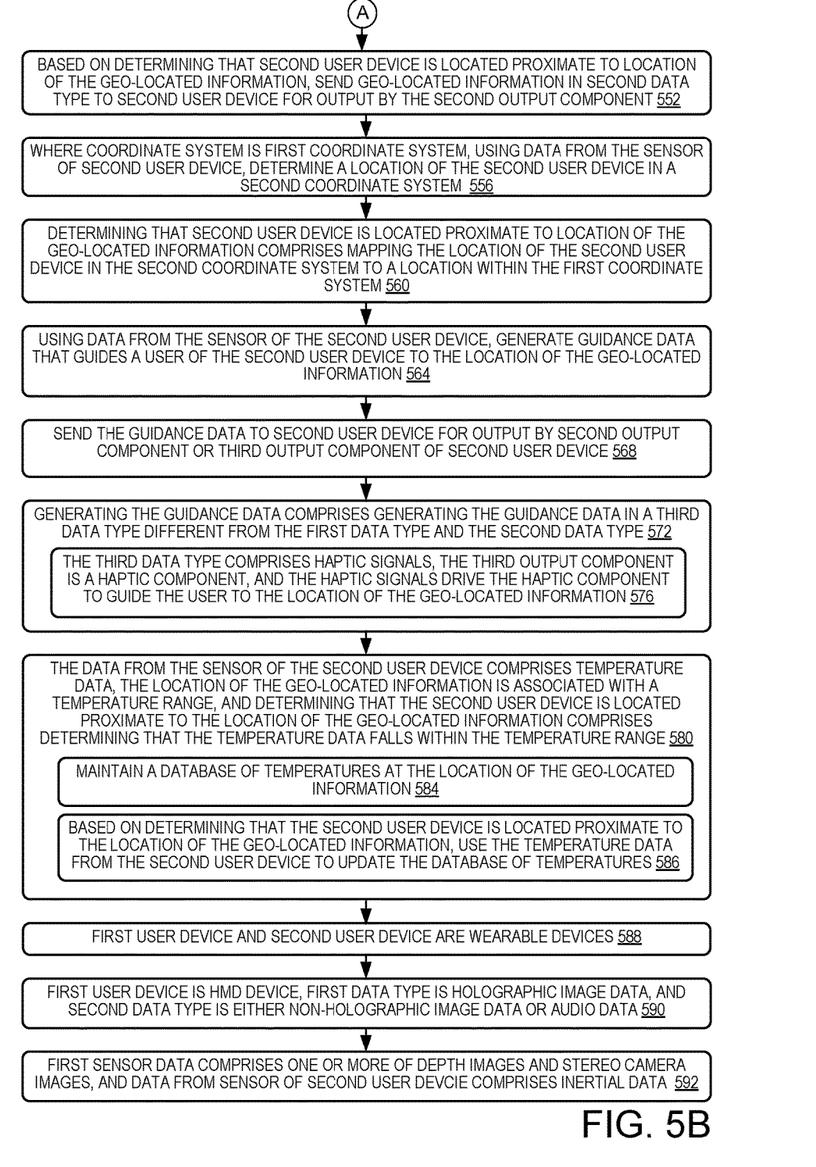

With reference now to FIGS. 5A-5B, a flow chart of an example method 500 is illustrated for sharing geo-located information in a physical environment between different devices. The following description of method 500 is provided with reference to the software and hardware components described herein and shown in FIGS. 1-4 and 6. It will be appreciated that method 500 also may be performed in other contexts using other suitable hardware and software components.

With reference to FIG. 5A, at 504 the method 500 may include receiving the geo-located information from a first user device in the physical environment. At 508, the method 500 may include, wherein the geo-located information has a first data type that is compatible with a first output component of the first user device. At 512, the method 500 may include, wherein the first user device is a wearable device. At 516, the method 500 may include, wherein the first user device is a head-mounted display device and the first data type is holographic image data.

At 520, the method 500 may include receiving first sensor data from a sensor of the first user device in the physical environment. At 524, the method 500 may include, wherein the first sensor data comprises one or more of depth images and stereo camera images. At 528, the method 500 may include, using at least the first sensor data, determining a location of the geo-located information within a coordinate system in the physical environment.

At 532, the method 500 may include determining that a second user device is located in the physical environment. At 536, the method 500 may include wherein the second user device is a wearable device. At 540, the method 500 may include determining that the second user device does not comprise an output component that is compatible with the first data type of the geo-located information. At 544, the method 500 may include, based on determining that the second user device does not comprise an output component that is compatible with the first data type, transforming the geo-located information from the first data type into a second data type that is compatible with a second output component of the second user device. At 548, the method 500 may include, using data from a sensor of the second user device, determining that the second user device is located proximate to the location of the geo-located information in the physical environment.

With reference now to FIG. 5B, at 552 the method 500 may include, based on determining that the second user device is located proximate to the location of the geo-located information, sending the geo-located information in the second data type to the second user device for output by the second output component. At 556, the method 500 may include, wherein the coordinate system is a first coordinate system, using the data from the sensor of the second user device, determining a location of the second user device in a second coordinate system. At 560, the method 500 may include, wherein determining that the second user device is located proximate to the location of the geo-located information comprises mapping the location of the second user device in the second coordinate system to a location within the first coordinate system.

At 564 the method 500 may include, using data from the sensor of the second user device, generating guidance data that guides a user of the second user device to the location of the geo-located information. At 568, the method 500 may include sending the guidance data to the second user device for output by the second output component or a third output component of the second user device. At 572, the method 500 may include, wherein generating the guidance data comprises generating the guidance data in a third data type different from the first data type and the second data type. At 576, the method 500 may include, wherein the third data type comprises haptic signals and the third output component is a haptic component, and the haptic signals drive the haptic component to guide the user to the location of the geo-located information.

At 580 the method 500 may include, wherein the data from the sensor of the second user device comprises temperature data, the location of the geo-located information is associated with a temperature range, and determining that the second user device is located proximate to the location of the geo-located information comprises determining that the temperature data falls within the temperature range. At 584, the method 500 may include maintaining a database of temperatures at the location of the geo-located information. At 586, the method 500 may include, based on determining that the second user device is located proximate to the location of the geo-located information, using the temperature data from the second user device to update the database of temperatures.

At 588, the method 500 may include, wherein the first user device and the second user device are wearable devices. At 590 the method 500 may include, wherein first user device is a HMD device, the first data type is holographic image data, and the second data type is either non-holographic image data or audio data. At 592 the method 500 may include, wherein the first sensor data comprises one or more of depth images and stereo camera images, and the data from the sensor of the second user device comprises inertial data.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
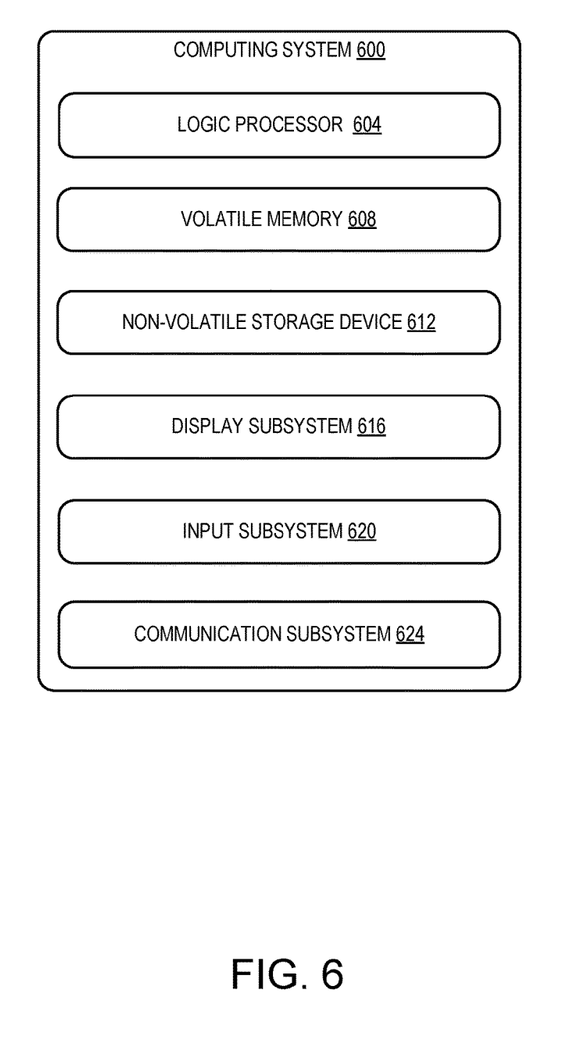
FIG. 6 shows a block diagram of a computing system according to examples of the present disclosure.

FIG. 6 schematically shows a non-limiting embodiment of a computing system 600 that can enact one or more of the methods and processes described above. Computing system 600 is shown in simplified form. Computing system 600 may take the form of one or more gaming consoles, personal computers, server computers, tablet computers, home-entertainment computers, network computing devices, gaming devices, mobile computing devices, mobile communication devices (e.g., smart phones), and/or other computing devices, including wearable computing devices such as smart wristwatches and head mounted display devices. In the above examples, computing device 104, HMD device 120, and mobile computing devices 160, 192 may comprise computing system 600 or one or more aspects of computing system 600.

Computing system 600 includes a logic processor 604, volatile memory 608, and a non-volatile storage device 612. Computing system 600 may optionally include a display subsystem 616, input subsystem 620, communication subsystem 624, and/or other components not shown in FIG. 6.

Logic processor 604 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 604 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 604 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 612 includes one or more physical devices configured to hold instructions executable by the logic processors to implement the methods and processes described herein. When such methods and processes are implemented, the state of non-volatile storage device 612 may be transformed—e.g., to hold different data.

Non-volatile storage device 612 may include physical devices that are removable and/or built-in. Non-volatile storage device 612 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 612 may include nonvolatile, dynamic, static, read/write, read-only, sequential-access, location-addressable, file-addressable, and/or content-addressable devices. It will be appreciated that non-volatile storage device 612 is configured to hold instructions even when power is cut to the non-volatile storage device 612.

Volatile memory 608 may include physical devices that include random access memory. Volatile memory 608 is typically utilized by logic processor 604 to temporarily store information during processing of software instructions. It will be appreciated that volatile memory 608 typically does not continue to store instructions when power is cut to the volatile memory 608.

Aspects of logic processor 604, volatile memory 608, and non-volatile storage device 612 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 600 typically implemented in software by a processor to perform a particular function using portions of volatile memory, which function involves transformative processing that specially configures the processor to perform the function. Thus, a program or application may be instantiated via logic processor 604 executing instructions held by non-volatile storage device 612, using portions of volatile memory 608. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 616 may be used to present a visual representation of data held by non-volatile storage device 612. As the herein described methods and processes change the data held by the non-volatile storage device, and thus transform the state of the non-volatile storage device, the state of display subsystem 616 may likewise be transformed to visually represent changes in the underlying data. Display subsystem 616 may include one or more display devices utilizing virtually any type of technology. Such display devices may be combined with logic processor 604, volatile memory 608, and/or non-volatile storage device 612 in a shared enclosure, or such display devices may be peripheral display devices.

When included, input subsystem 620 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 624 may be configured to communicatively couple various computing devices described herein with each other, and with other devices. Communication subsystem 624 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides, at a computing device, a method for sharing geo-located information in a physical environment between different devices, the method comprising, receiving the geo-located information from a first user device in the physical environment, the geo-located information having a first data type that is compatible with a first output component of the first user device, receiving first sensor data from a sensor of the first user device in the physical environment, using at least the first sensor data, determining a location of the geo-located information within a coordinate system in the physical environment, determining that a second user device is located in the physical environment, determining that the second user device does not comprise an output component that is compatible with the first data type, based on determining that the second user device does not comprise an output component compatible with the first data type, transforming the geo-located information from the first data type into a second data type that is compatible with a second output component of the second user device, using data from a sensor of the second user device, determining that the second user device is located proximate to the location of the geo-located information in the physical environment, and based on determining that the second user device is located proximate to the location of the geo-located information, sending the geo-located information in the second data type to the second user device for output by the second output component.

The method may additionally or alternatively include, wherein the coordinate system is a first coordinate system, the method further comprising, using the data from the sensor of the second user device, determining a location of the second user device in a second coordinate system, and wherein determining that the second user device is located proximate to the location of the geo-located information comprises mapping the location of the second user device in the second coordinate system to a location within the first coordinate system.

The method may additionally or alternatively include using data from the sensor of the second user device, generating guidance data that guides a user of the second user device to the location of the geo-located information, and sending the guidance data to the second user device for output by the second output component or a third output component of the second user device. The method may additionally or alternatively include, wherein generating the guidance data comprises generating the guidance data in a third data type different from the first data type and the second data type. The method may additionally or alternatively include, wherein the third data type comprises haptic signals and the third output component is a haptic component, and the haptic signals drive the haptic component to guide the user to the location of the geo-located information.

The method may additionally or alternatively include, wherein the data from the sensor of the second user device comprises temperature data, the location of the geo-located information is associated with a temperature range, and determining that the second user device is located proximate to the location of the geo-located information comprises determining that the temperature data falls within the temperature range. The method may additionally or alternatively include maintaining a database of temperatures at the location of the geo-located information, and based on determining that the second user device is located proximate to the location of the geo-located information, using the temperature data from the second user device to update the database of temperatures.

The method may additionally or alternatively include, wherein the first user device and the second user device are wearable devices. The method may additionally or alternatively include, wherein the first user device is a head-mounted display device, the first data type is holographic image data, and the second data type is either non-holographic image data or audio data. The method may additionally or alternatively include, wherein the first sensor data comprises one or more of depth images and stereo camera images, and the data from the sensor of the second user device comprises inertial data.

Another aspect provides a computing device for sharing geo-located information in a physical environment between different devices, comprising a processor, and a memory holding instructions executable by the processor to receive the geo-located information from a first user device in the physical environment, the geo-located information having a first data type that is compatible with a first output component of the first user device, receive first sensor data from a sensor of the first user device in the physical environment, using at least the first sensor data, determine a location of the geo-located information within a coordinate system in the physical environment, determine that a second user device is located in the physical environment, determine that the second user device does not comprise an output component that is compatible with the first data type, based on determining that the second user device does not comprise an output component that is compatible with the first data type, transform the geo-located information from the first data type into a second data type that is compatible with a second output component of the second user device, using data from a sensor of the second user device, determine that the second user device is located proximate to the location of the geo-located information in the physical environment, and based on determining that the second user device is located proximate to the location of the geo-located information, send the geo-located information in the second data type to the second user device for output by the second output component.

The computing device may additionally or alternatively include, wherein the coordinate system is a first coordinate system, and the instructions are further executable by the processor to, using the data from the sensor of the second user device, determine a location of the second user device in a second coordinate system, and wherein determining that the second user device is located proximate to the location of the geo-located information comprises mapping the location of the second user device in the second coordinate system to a location within the first coordinate system.

The computing device may additionally or alternatively include, wherein the instructions are further executable by the processor to, using data from the sensor of the second user device, generate guidance data that guides a user of the second user device to the location of the geo-located information, and send the guidance data to the second user device for output by the second output component or a third output component of the second user device. The computing device may additionally or alternatively include, wherein generating the guidance data comprises generating the guidance data in a third data type different from the first data type and the second data type. The computing device may additionally or alternatively include, wherein the third data type comprises haptic signals and the third output component is a haptic component, and the haptic signals drive the haptic component to guide the user to the location of the geo-located information.

The computing device may additionally or alternatively include, wherein the data from the sensor of the second user device comprises temperature data, the location of the geo-located information is associated with a temperature range, and determining that the second user device is located proximate to the location of the geo-located information comprises determining that the temperature data falls within the temperature range. The computing device may additionally or alternatively include, wherein the instructions are further executable by the processor to maintain a database of temperatures at the location of the geo-located information, and based on determining that the second user device is located proximate to the location of the geo-located information, use the temperature data from the second user device to update the database of temperatures.

The computing device may additionally or alternatively include, wherein the first user device and the second user device are wearable devices. The computing device may additionally or alternatively include, wherein the first user device is a head-mounted display device, the first data type is holographic image data, and the second data type is either non-holographic image data or audio data.

Another aspect provides a head mounted display device, comprising a holographic display, a processor, and a memory holding instructions executable by the processor to generate geo-located information at a location within a coordinate system in a physical environment, the geo-located information having a first data type that is compatible with the holographic display, determine that another device is located in the physical environment, determine that the other device does not comprise an output component that is compatible with the first data type, based on determining that the other device does not comprise an output component that is compatible with the first data type, transform the geo-located information from the first data type into a second data type that is compatible with an output component of the other device, using data from a sensor of the other device, determine that the other device is located proximate to the location of the geo-located information in the physical environment, and based on determining that the other device is located proximate to the location of the geo-located information, send the geo-located information in the second data type to the other device for output by the output component.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for sharing geo-located information in a physical environment between different devices, the method comprising:
receiving the geo-located information from a first user device in the physical environment, the geo-located information having a first data type that is compatible with a first output component of the first user device;
receiving first sensor data from a sensor of the first user device in the physical environment;
using at least the first sensor data, determining a location of the geo-located information within a coordinate system in the physical environment;
determining that a second user device is located in the physical environment;
determining that the second user device does not comprise an output component that is compatible with the first data type;
based on determining that the second user device does not comprise an output component compatible with the first data type, transforming the geo-located information from the first data type into a second data type that is compatible with a second output component of the second user device;
using data from a sensor of the second user device, determining that the second user device is located proximate to the location of the geo-located information in the physical environment; and
based on determining that the second user device is located proximate to the location of the geo-located information, sending the geo-located information in the second data type to the second user device for output by the second output component.

2. The method of claim 1, wherein the coordinate system is a first coordinate system, the method further comprising:
using the data from the sensor of the second user device, determining a location of the second user device in a second coordinate system; and
wherein determining that the second user device is located proximate to the location of the geo-located information comprises mapping the location of the second user device in the second coordinate system to a location within the first coordinate system.

3. The method of claim 1, further comprising:
using data from the sensor of the second user device, generating guidance data that guides a user of the second user device to the location of the geo-located information; and
sending the guidance data to the second user device for output by the second output component or a third output component of the second user device.

4. The method of claim 3, wherein generating the guidance data comprises generating the guidance data in a third data type different from the first data type and the second data type.

5. The method of claim 4, wherein the third data type comprises haptic signals and the third output component is a haptic component, and the haptic signals drive the haptic component to guide the user to the location of the geo-located information.

6. The method of claim 1, wherein the data from the sensor of the second user device comprises temperature data, the location of the geo-located information is associated with a temperature range, and determining that the second user device is located proximate to the location of the geo-located information comprises determining that the temperature data falls within the temperature range.

7. The method of claim 6, further comprising:
maintaining a database of temperatures at the location of the geo-located information; and
based on determining that the second user device is located proximate to the location of the geo-located information, using the temperature data from the second user device to update the database of temperatures.

8. The method of claim 1, wherein the first user device and the second user device are wearable devices.

9. The method of claim 1, wherein the first user device is a head-mounted display device, the first data type is holographic image data, and the second data type is either non-holographic image data or audio data.

10. The method of claim 1, wherein the first sensor data comprises one or more of depth images and stereo camera images, and the data from the sensor of the second user device comprises inertial data.

11. A computing device for sharing geo-located information in a physical environment between different devices, comprising:
a processor; and
a memory holding instructions executable by the processor to,
receive the geo-located information from a first user device in the physical environment, the geo-located information having a first data type that is compatible with a first output component of the first user device;
receive first sensor data from a sensor of the first user device in the physical environment;
using at least the first sensor data, determine a location of the geo-located information within a coordinate system in the physical environment;
determine that a second user device is located in the physical environment;
determine that the second user device does not comprise an output component that is compatible with the first data type;
based on determining that the second user device does not comprise an output component that is compatible with the first data type, transform the geo-located information from the first data type into a second data type that is compatible with a second output component of the second user device;
using data from a sensor of the second user device, determine that the second user device is located proximate to the location of the geo-located information in the physical environment; and
based on determining that the second user device is located proximate to the location of the geo-located information, send the geo-located information in the second data type to the second user device for output by the second output component.

12. The computing device of claim 11, wherein the coordinate system is a first coordinate system, and the instructions are further executable by the processor to:
using the data from the sensor of the second user device, determine a location of the second user device in a second coordinate system; and
wherein determining that the second user device is located proximate to the location of the geo-located information comprises mapping the location of the second user device in the second coordinate system to a location within the first coordinate system.

13. The computing device of claim 11, wherein the instructions are further executable by the processor to:

using data from the sensor of the second user device, generate guidance data that guides a user of the second user device to the location of the geo-located information; and send the guidance data to the second user device for output by the second output component or a third output component of the second user device.

14. The computing device of claim 13, wherein generating the guidance data comprises generating the guidance data in a third data type different from the first data type and the second data type.

15. The computing device of claim 14, wherein the third data type comprises haptic signals and the third output component is a haptic component, and the haptic signals drive the haptic component to guide the user to the location of the geo-located information.

16. The computing device of claim 11, wherein the data from the sensor of the second user device comprises temperature data, the location of the geo-located information is associated with a temperature range, and determining that the second user device is located proximate to the location of the geo-located information comprises determining that the temperature data falls within the temperature range.

17. The computing device of claim 16, wherein the instructions are further executable by the processor to:

maintain a database of temperatures at the location of the geo-located information; and based on determining that the second user device is located proximate to the location of the geo-located information, use the temperature data from the second user device to update the database of temperatures.

18. The computing device of claim 11, wherein the first user device and the second user device are wearable devices.

19. The computing device of claim 11, wherein the first user device is a head-mounted display device, the first data type is holographic image data, and the second data type is either non-holographic image data or audio data.

20. A head mounted display device, comprising:

a holographic display;

a processor; and a memory holding instructions executable by the processor to, generate geo-located information at a location within a coordinate system in a physical environment, the geo-located information having a first data type that is compatible with the holographic display;

determine that another device is located in the physical environment;

determine that the other device does not comprise an output component that is compatible with the first data type;

based on determining that the other device does not comprise an output component that is compatible with the first data type, transform the geo-located information from the first data type into a second data type that is compatible with an output component of the other device;

using data from a sensor of the other device, determine that the other device is located proximate to the location of the geo-located information in the physical environment; and based on determining that the other device is located proximate to the location of the geo-located information, send the geo-located information in the second data type to the other device for output by the output component.

* * * * *